L. BONHAM.
FARE REGISTER.
APPLICATION FILED APR. 1, 1918.
1,372,655.
Patented Mar. 22, 1921.
10 SHEETS—SHEET 9.
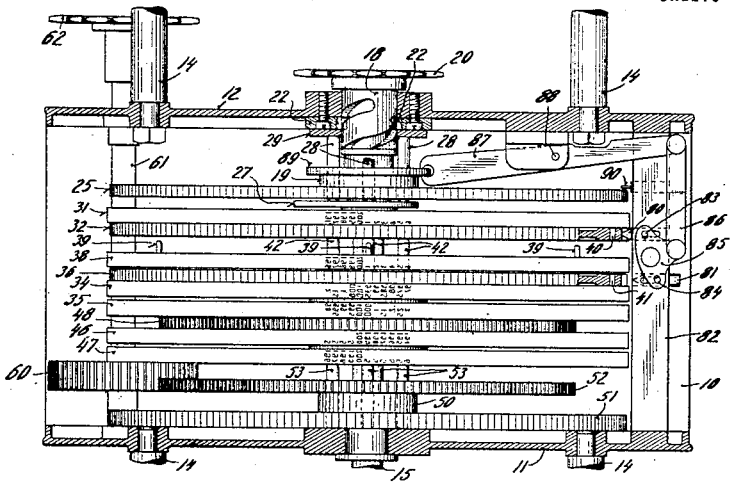
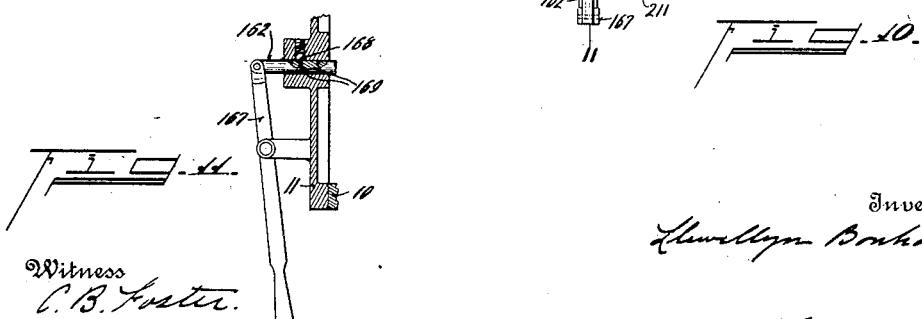

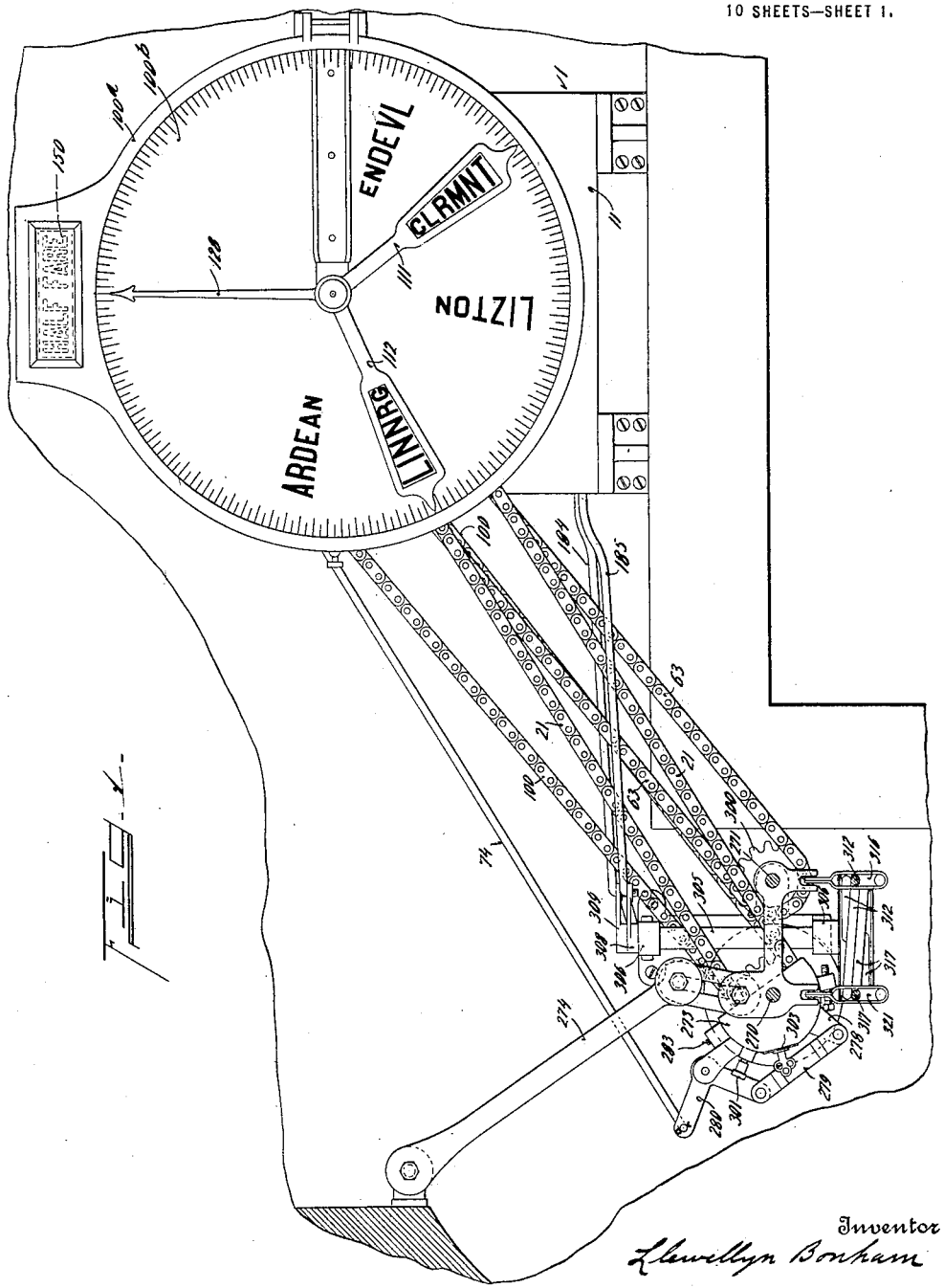

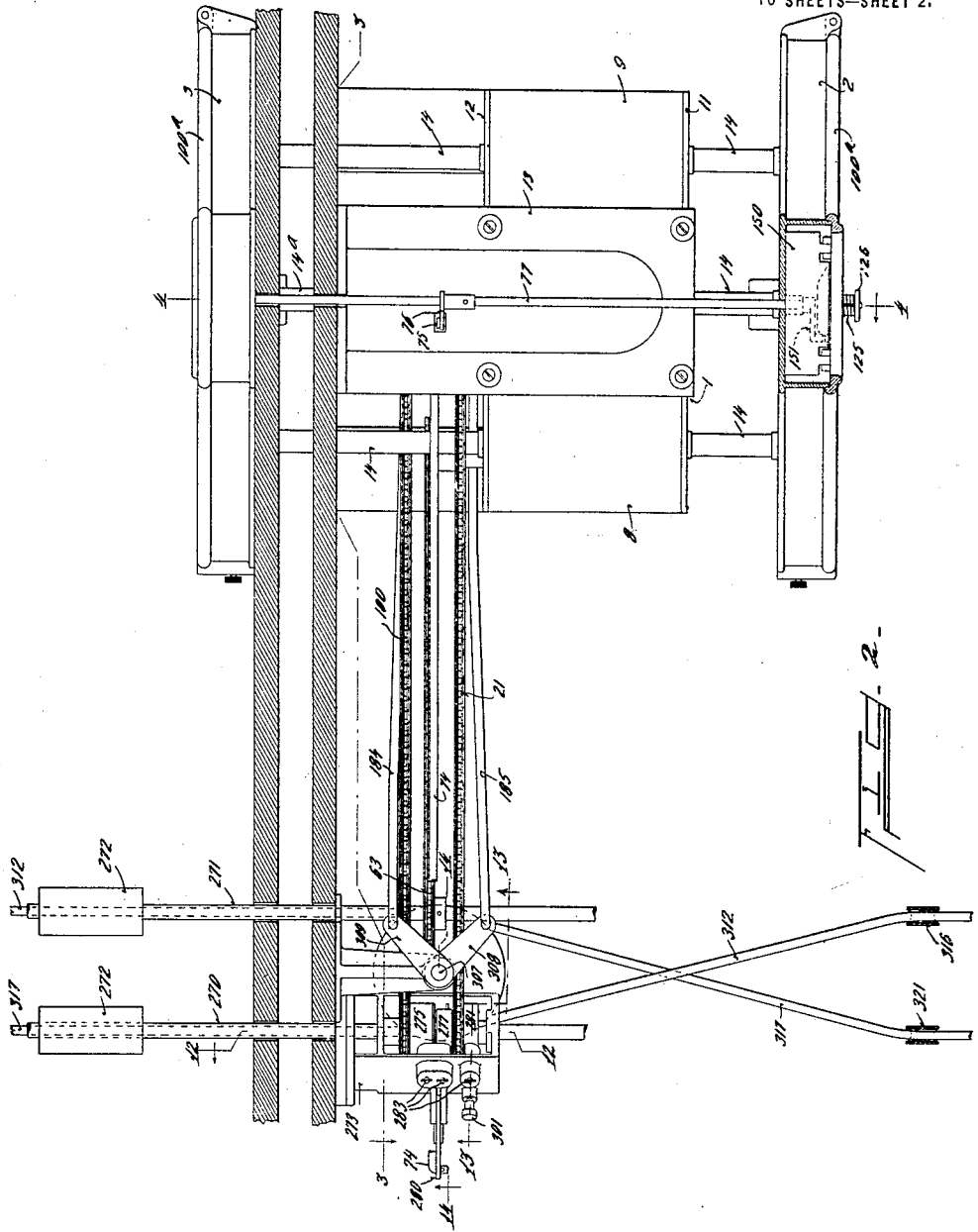

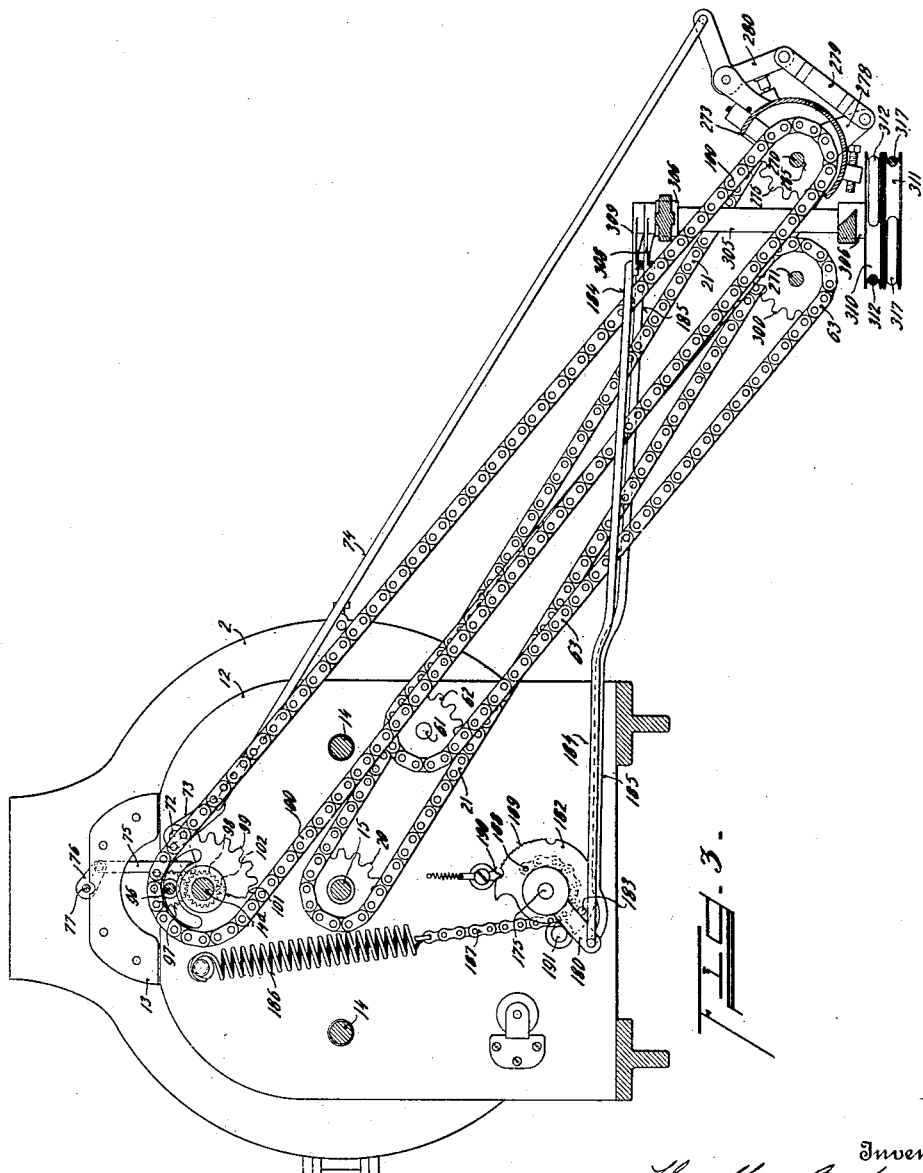

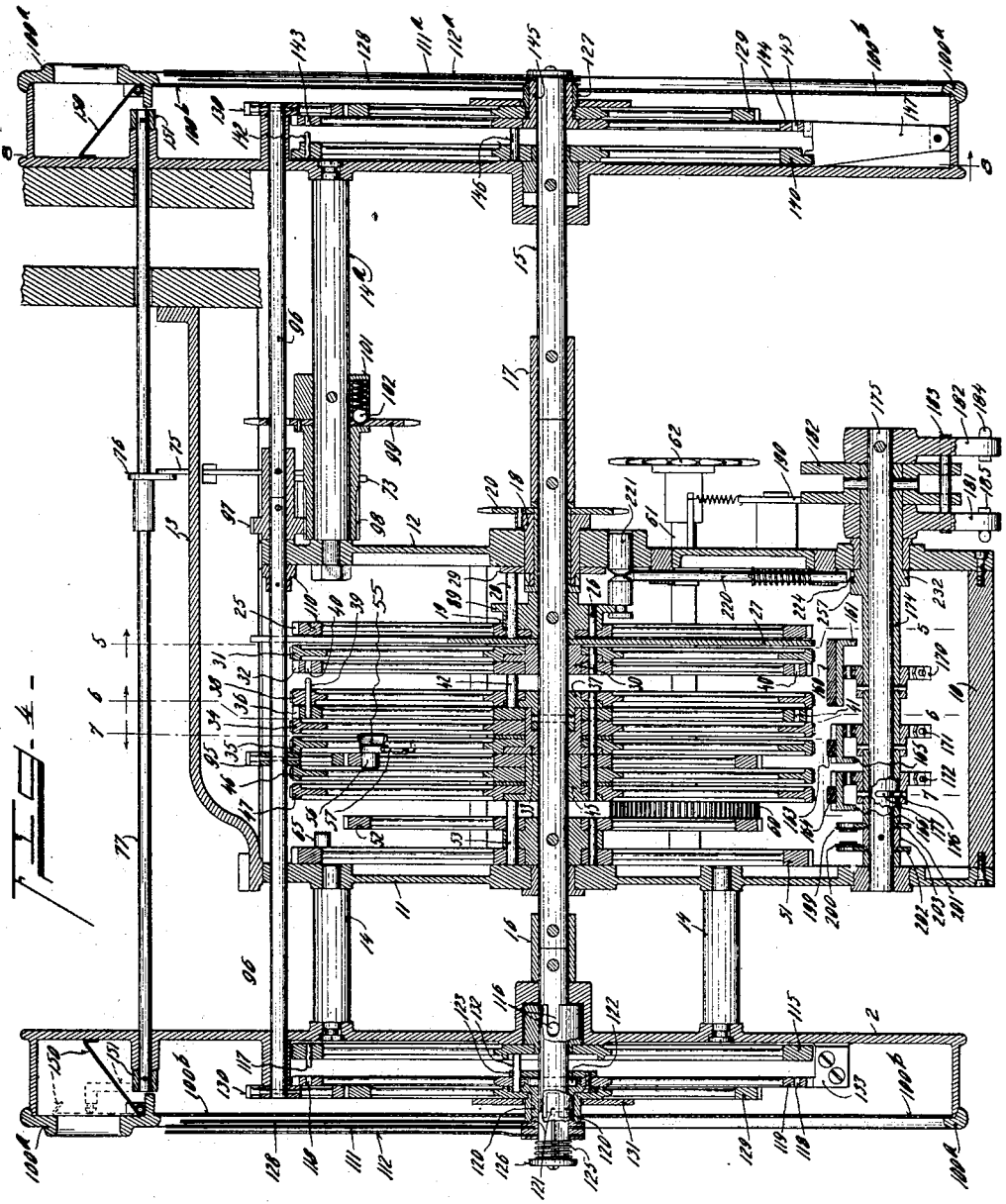

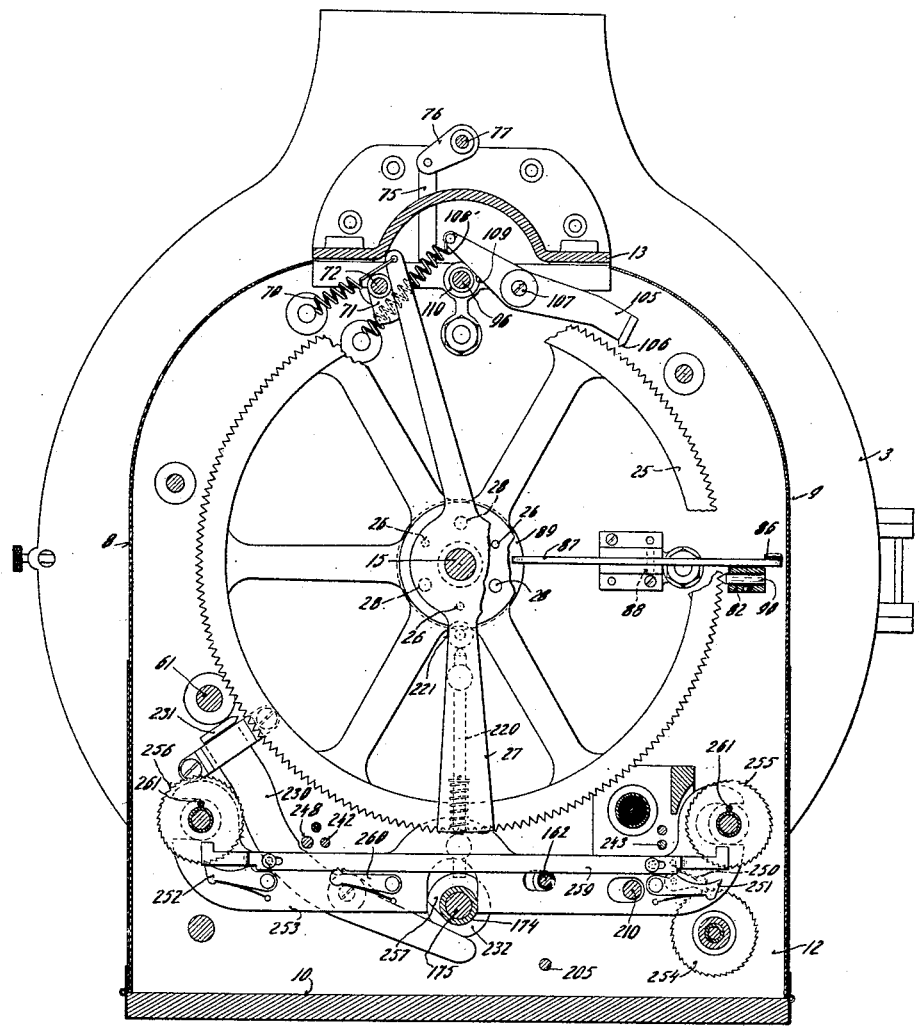

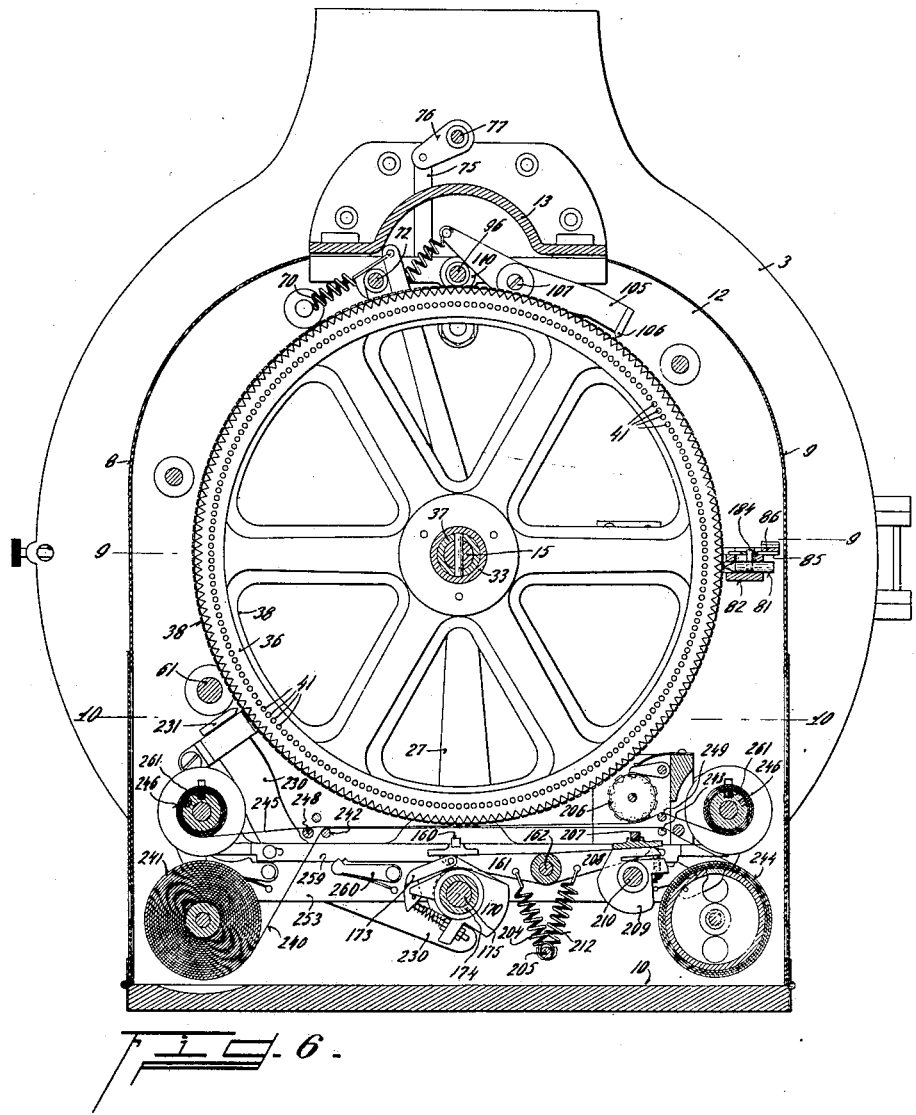

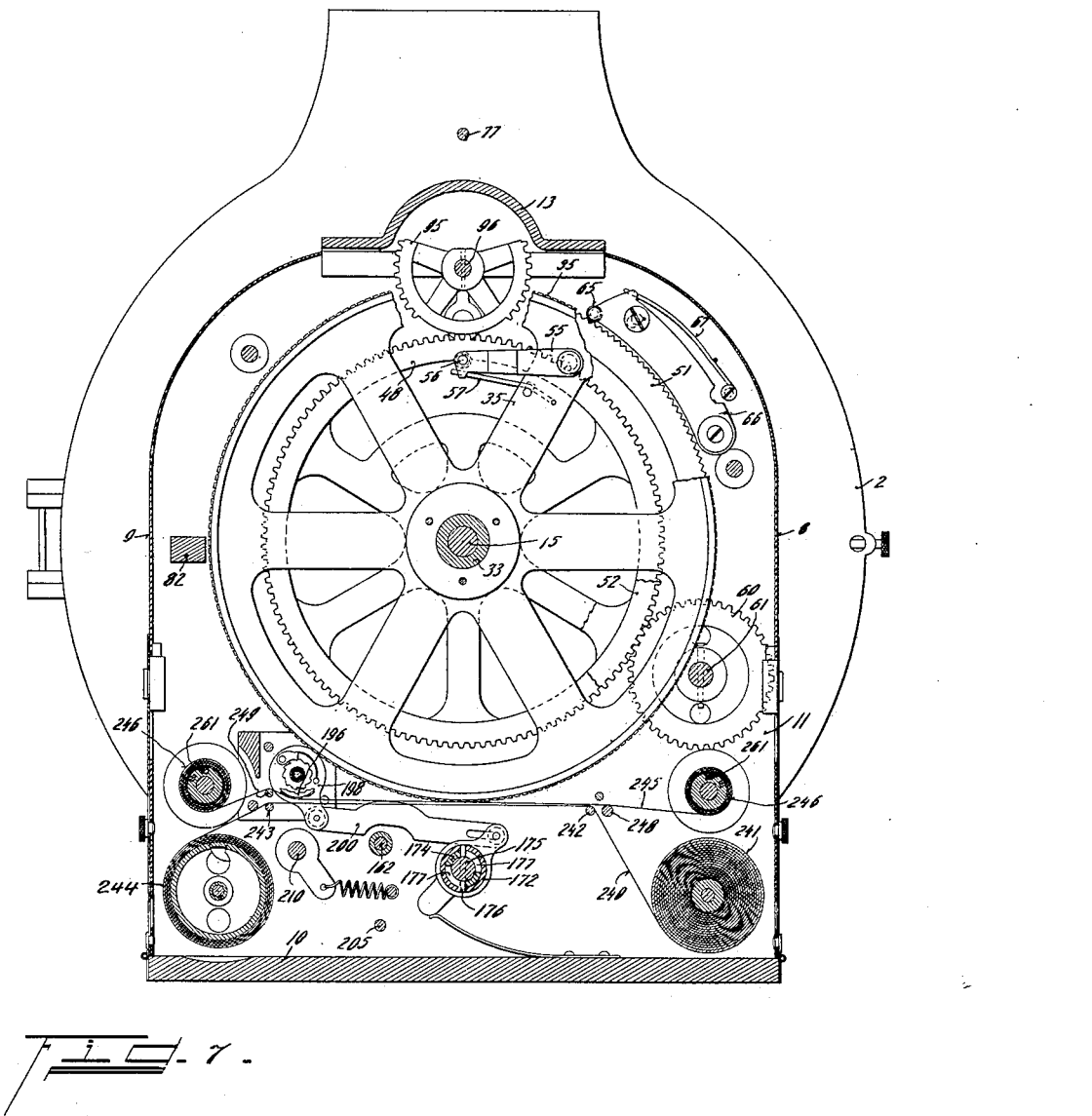

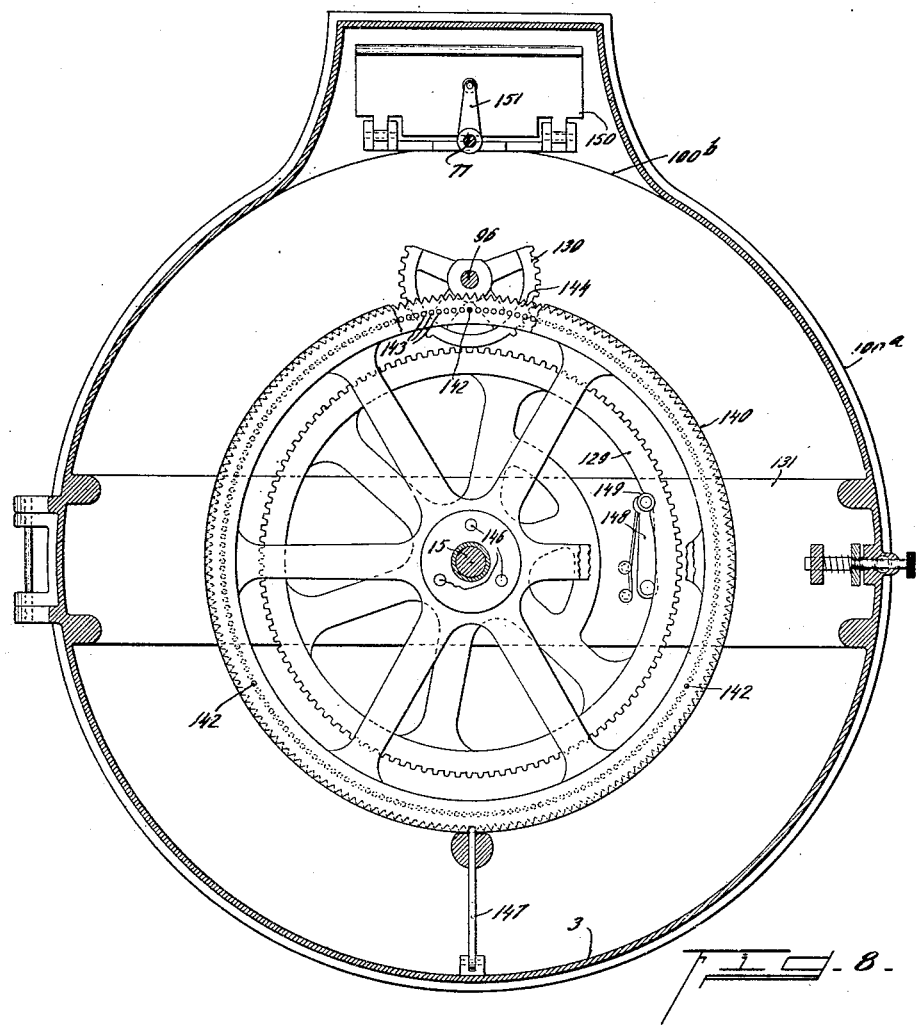

L. BONHAM.
FARE REGISTER.
APPLICATION FILED APR. 1, 1918.
1,372,655.
Patented Mar. 22, 1921.
10 SHEETS—SHEET 10.
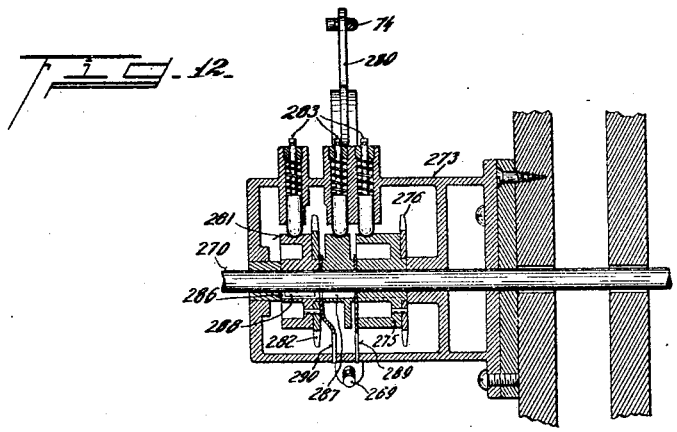
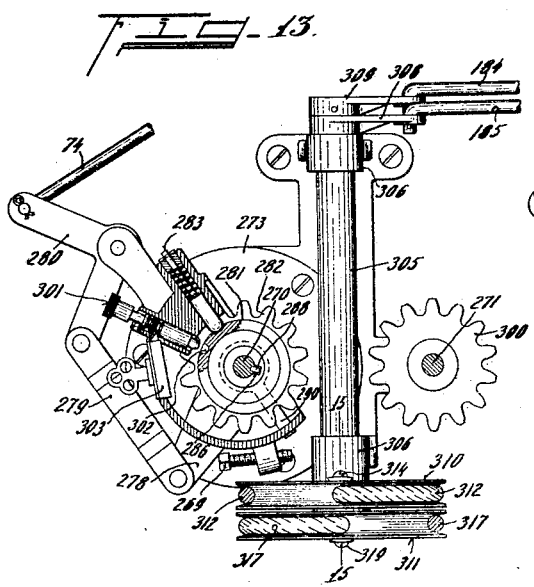
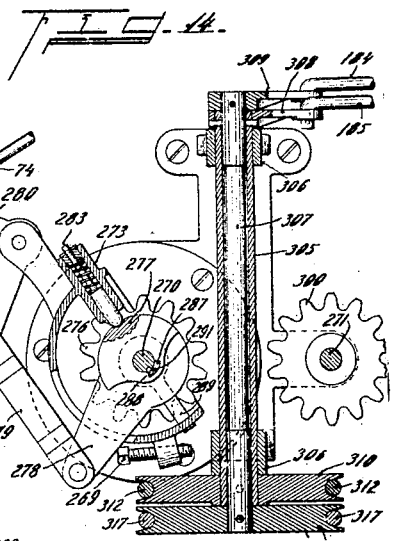
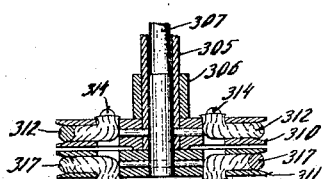
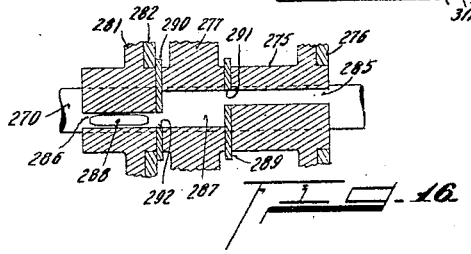
Inventor
Llewellyn Bonham
By Wood & Wood
Attorneys
Witness
C. B. Foster
L. A. Beck

UNITED STATES PATENT OFFICE.

LLEWELLYN BONHAM, OF OXFORD, OHIO, ASSIGNOR TO THE BONHAM RECORDER COMPANY, OF HAMILTON, OHIO, A CORPORATION OF OHIO.

FARE-REGISTER.

1,372,655.  Specification of Letters Patent.  Patented Mar. 22, 1921.

Application filed April 1, 1918. Serial No. 225,981.

*To all whom it may concern:*

Be it known that I, LLEWELLYN BONHAM, a citizen of the United States, and residing at Oxford, in the county of Butler and State of Ohio, have invented a new and useful Improvement in Fare-Registers, of which the following specification is a full disclosure.

This invention relates to fare indicating and recording machines primarily adapted for use on passenger cars in inter-city service, in which the fares are computed on a mileage rate or zone basis.

The object of this invention is to provide a manually operated recording and indicating mechanism wherein certain steps comprising a complete operation must follow in predetermined sequence for an automatic computation of fare values.

Another object is to provide a series of selectively positioned recording elements defining "departure" and "destination" stations and fare values, the "destination" station element operating alternately with the "departure" and fare value elements to automatically compute the appropriate fares.

A further object is to provide mileage recording elements normally unitarily operated with the fare value elements and to provide for an arbitrary alteration of the computed fare values independent of the mileage elements.

Another object is to provide a machine of the above character in which the recording elements comprise a pair of "mileage" type wheels and a pair of "cash" type wheels constituting value elements, the wheels of each pair having duplicate type characters arranged in relative reverse order, a "departure" station type wheel spaced therefrom and an intermediate "destination" station type wheel, both having duplicate type characters arranged in the same relative order, all of the type wheels supported by a single shaft arranged to alternately connect the "destination" type wheel with the opposing type wheels.

Another object is to provide a "half-fare" recording and indicating mechanism.

Another object is to provide selecting and operating devices controlling the recording and indicating mechanisms.

Other objects include provisions for printing a record from the present recording elements; for separately recording the number of different classes of fares collected; for adapting the printing mechanism to print different types of records distinguishing different classes of fares and for various locking and interlocking features insuring proper operation of the entire mechanism.

Various other objects and features of the invention will be apparent from the drawing disclosure accompanied herewith, and from the description thereof. In such drawings like characters of reference denote corresponding parts throughout the several views, of which:—

Figure 1 is a front elevation of the recorder and connected setting mechanism, shown as mounted upon the partition of a car.

Fig. 2 is a top plan view.

Fig. 3 is a transverse vertical section on line 3, 3, Fig. 2.

Fig. 4 is a longitudinal vertical section on line 4, 4, Fig. 2.

Fig. 5 is a transverse vertical section on line 5, 5, Fig. 4.

Fig. 6 is a transverse vertical section on line 6, 6, Fig. 4.

Fig. 7 is a transverse vertical section on line 7, 7, Fig. 4.

Fig. 8 is a transverse vertical section on line 8, 8, Fig. 4.

Fig. 9 is a plan section on line 9, 9, Fig. 6.

Fig. 10 is a plan section on line 10, 10, Fig. 6.

Fig. 11 is a detail vertical section on line 11, Fig. 10.

Fig. 12 is a detail vertical section on line 12, 12, Fig. 2.

Fig. 13 is a detail vertical section on line 13, 13, Fig. 2.

Fig. 14 is a detail vertical section on line 14, 14, Fig. 2.

Fig. 15 is a detail vertical section on line 15, 15, Fig. 13.

Fig. 16 is a diagrammatic view, showing the key slot arrangement of the selecting rod.

In the drawings, the recorder is shown secured to the partition of a car and having a main housing 1 inclosing the recording mechanism and a dial casing 2 on one side of the partition and a duplicate dial casing 3 on the opposite side thereof, thereby providing a fare indication for the compartments on both sides of the partition.

The setting and operating devices are positioned to one side of the car and are connected to the recording mechanism by suitable motion transmitting elements, in the present instance by rods and chains, as shown.

The recorder housing 1 comprises a base plate 10, end frames 11, 12, side plates 8, 9, and cover plate 13. The dial casings 2, 3, are supported on studs 14 extending from the end frames. A main indicator shaft 15 is journaled in bearings in the end frames and dial casings and between the end frames this shaft supports a series of printing wheels arranged to coöperate with printing mechanism positioned within the lower part of the recorder housing, as will later be described.

For convenience of installation, this shaft is shown as of three sections joined by sleeve couplings 16, 17. For the purpose of laterally shifting said shaft to operatively clutch certain of the printing wheels together, I provide a sleeve 18 loosely journaled in the end frame 12 and on the shaft 15 and confined against lateral movement on said shaft by the sleeve coupling 17 and a collar 19, which is fixed on the shaft. The sleeve 18 is provided with a sprocket 20 to be engaged by a chain 21, (see Figs. 1, 2 and 3) leading to and operated by the setting mechanism, as will later be described. The sleeve 18 is also provided with spiral grooves (see Fig. 9), engaging studs 22 secured to the end frame 12. This mechanism provides a lateral shifting of the shaft 15 by a rotary movement of the sleeve 18.

The various type wheels and other elements supported on the shaft 15 between the end frames, will now be described as to their construction, leaving their specific mode of operation and functions for future consideration.

25 represents a toothed alining wheel secured by pins 26 to the flanged sleeve 19, and 27 represents a "half-fare" printing segment loosely journaled on the shaft 15. Three spacing pins 28 project through apertures in the wheel 25 and sleeve 19, one end of each pin engaging one side of the segment 27 and the opposite ends engaging a surface collar 29 adjacent the end frame 12. Adjacent the half-fare segment 27, a flanged sleeve 30 is loosely journaled on the shaft 15 and has secured thereto a "departure" type wheel 31 and a companion toothed lock and clutch wheel 32. Spaced from the sleeve 30 is a flanged sleeve 33, loosely mounted on the shaft 15 and having secured thereto two type wheels 34, 35, and a companion toothed lock and clutch wheel 36, all adapted to operate as a unit. The type wheel 34 is the "miles in" wheel and the type wheel 35 is the "miles out" wheel, the characters on these miles wheels being arranged in relative reverse order and their functions are to indicate the miles between selected stations on the "in" and "out" trips of the car.

These type wheels are provided with a negative or zero type character to be alined with two corresponding station indicating characters of the "departure" and "destination" station wheels in the initial setting of said wheels.

Intermediate the sleeves 30, 32, is a flanged sleeve 37 fixed to the shaft 15 and having secured thereto a "destination" type wheel 38 having a series of three fixed clutch pins 39 projecting laterally in radial alinement with and adapted to alternately engage in clutch apertures 40, 41, in the lock and clutch wheels 32, 36, respectively, upon an appropriate shifting of the shaft 15. The spaced relationship of the sleeves 30, 32, and connected wheels, is maintained by spacing pins 42 projecting through apertures in the sleeve 37 and type wheel 38, the opposite ends thereof frictionally engaging the opposing surfaces of the clutch wheels 32, 36. The "departure" type wheel 31 and "destination" type wheel 38 are provided with suitable station indicating type characters arranged in the same relative order.

A flanged sleeve 45 is loosely journaled on the shaft 15, adjacent the sleeve 32, and has secured thereto two type wheels 46, 47, and a gear wheel 48. The type wheels 46, 47, are "cash" wheels and are provided with characters arranged in relative reverse order to indicate the individual cash fares received on the "in" and "out" trips of the car.

Fixed to the shaft 15, intermediate the sleeve 45 and the end frame 11, is a flanged sleeve 50 having secured thereto a toothed ratchet wheel 51 and a setting gear 52. Spacing pins 53 project through apertures in the sleeve 50, wheel 51, and gear 52, their opposite ends frictionally engaging the end frame 11 and sleeve 45 to maintain the spaced relationship therebetween.

The "cash" wheel unit comprising the type wheels 46, 47, and the gear wheel 48, is normally connected to operate with the adjacent "mile" wheel unit by means of a yielding connection comprising an arm 55, (see Figs. 4 and 7), pivotally mounted on the "miles" type wheel 35 and having an anti-friction roller 56 engaging a notch in the inner periphery of the circumferential web of the gear wheel 48. A spring 57 yieldingly retains said roller in its notch engagement providing a unitary rotation of the two value type wheel units.

The purpose of this connection is to permit an independent arbitrary setting of the "cash" wheels subsequent to the automatic setting thereof to subtract or add amounts for a final arbitrary fare indication. The specific mechanism for operating this "arbitrary" gear will be later described.

The gear 52, which may be termed the main setting gear, meshed with a wide face pinion 60 secured to a drive shaft 61 journaled in bearings in the end frames and provided with a sprocket 62 to be engaged by a chain 63, (see Figs. 1, 2 and 3), leading to and operated by the setting mechanism at the side of the car.

The ratchet wheel 51 is engaged by an anti-friction roller 65 mounted on a pivoted arm 66 which is spring pressed toward said wheel by a spring 67. This ratchet device provides a flexible alinement of the selected printing characters at the printing line as an aid to the proper setting thereof. The width of the roller 65 and the drive pinion 60 are sufficient to maintain coöperation with their companion elements regardless of the lateral shifting thereof.

The "half-fare" type sector 27 is provided with two printing characters, one indicating a full fare and the other a half-fare, but it is obvious that only the half-fare character may be provided if desired, a blank space on the record strip then indicating that the record is for a full fare. This type sector is retained in normal full fare printing position by a spring 70 attached to a stud on the end frame 11 and to the upper arm of said sector and is set to half-fare printing position by a cam 71 secured to and operated by a shaft 72, (see Fig. 5). The shaft 72 is journaled in the end frames and projects beyond the end frame 12 where there is secured to it a bell crank 73, the lower arm of which is pivotally connected to a rod 74 leading to and operated by the setting mechanism, (see Figs. 1, 2 and 3). The opposite arm of the bell crank 73 is connected by a link 75 to an arm 76 fixed to a "half-fare" indicating shaft 77 for operating the "half-fare" indicator, as will later be described. The "half-fare" segment 27 and the "half-fare" indicators may be termed classification recording and indicating elements in that they classify the fares collected.

To alternately lock the clutch wheels 32, 36, by the lateral movement of the main shaft, I provide two lock pins 80, 81, each slidably mounted in a bore in a cross-bar 82, (see Figs. 5, 6 and 9), in alinement with its respective clutch wheel. These pins are provided with studs 83, 84, projected upwardly through elongated slots in said cross-bar and engaging through orifices in a pivoted rock plate 85 connected by a link 86 to an operating rock lever 87. The lever 87 is pivoted at 88 in a bracket secured to the end frame 12 and has its inner end bifurcated to engage over the edge of a flange 89 formed on the sleeve 19. This provides a lock for the clutch wheel and connected type wheels disengaged by the clutch pins 39 of the "destination" wheel 38 and a release of the opposing clutch wheel and connected type wheels engaged thereby.

The toothed alining wheel 25, which is fixed on the main shaft, is locked against rotation during the shifting of the shaft by a pin 90 fixed in the cross-bar 82 and provided with a beveled nose corresponding in shape to the shape of the spaces between the teeth of said wheel.

The "arbitrary" setting gear 48, moving as a unit with the "cash" wheels 46, 47, is operated for a plus or minus setting, by an "arbitrary" segment 95 fixed on a shaft 96, which is journaled in the end frames and dial casings. This segment, as shown in Fig. 7, has a portion of its teeth cut away to provide for a normal setting of the "cash" wheel unit. A pinion 97 is fixed on the shaft 96 adjacent the end frame 12 and meshes with gear teeth 98 cut in the hub of a chain sprocket 99 loosely journaled on the stud 14$^a$. The sprocket 99 is connected to the setting mechanism by a chain 100 and is retained against lateral displacement by a collar 101 fixed to the stud 14$^a$.

To yieldingly retain the sprocket 99 in normal position against accidental rotary displacement, I provide a spring pressed ball 102, housed in a lateral bore in the collar 101 and engaging in a recess in the opposing surface of the sprocket, (see Fig. 4). As it is desirable to lock the main shaft during the operation of the "arbitrary" mechanism, I provide a lock arm 105, having a toothed edge 106, adapted to engage and lock the toothed alining wheel 25. Said arm is pivoted at 107 on the end frame 12, its opposite end normally retained by a spring 108, against a flat surface 109 of a cam 110 fixed on the shaft 96 of the "arbitrary" device.

The operation of setting the recording mechanism, as thus far described, will now be explained.

With the mechanism in normal position, as shown in Fig. 4, the sprocket 20 is rotated to shift the main shaft 15, to the right, to clutch the "destination" type wheel 38 to the clutch wheel 32 and companion "departure" type wheel 31. During this shifting movement the lock pin 80 (see Fig. 9), is withdrawn from the clutch wheel 32 and the lock pin 81 is engaged with the clutch wheel 34 to lock the value type wheels. The sprocket 62 is then rotated and through the main driving gear 52 will rotate the shaft 15 consequently rotating both the "departure" and "destination" type wheels to bring the proper "departure" type character to the printing line to record the station of departure. The main shaft is now shifted to the left, to the normal position, clutching the "destination" type wheel to the clutch wheel 36 and unitary value wheels, and the main shaft is again rotated to bring the proper "destination" type character to the printing line to record the destination station.

The value wheels, previously described, as

"miles" and "cash" type wheels operating with the "departure" type wheel, as a unit, automatically position the proper value type characters in printing alinement.

This provides an automatic computation of traffic values by a predetermined sequence of operation of "departure" and "destination" recording and indicating elements.

If a half-fare is to be recorded the "half-fare" type segment is operated by the rod 74 to bring the "half-fare" type character to the printing line. In case a change is to be made in the computed fare, the sprocket 99 is rotated. This will first lock the main shaft 15, by means of the lock arm 105 being engaged with the alining wheel 25, through the action of the cam 110 on the shaft 96. Further rotation of said shaft will engage the "arbitrary" segment 95 with the "arbitrary" gear 48 and rotate said gear and unitary cash value wheels 46 and 47, breaking its yielding connection, (the spring arm 55), with the locked adjacent "miles" type wheel 35. This operation of the cash value type wheels will position proper cash value type characters on the printing line to record an arbitrary cash fare.

Indicating mechanism.

The dial casings 2, 3, are of duplicate construction, each provided with a hinged annular cover plate 100ª and adjacent indicator dial 100ᵇ, each dial being removable for substitution by dials bearing different indicating characters adapting the recorder for universal use. As shown, the dial 100ᵇ is provided with a circumferential scale for indicating road distances between stations. This scale may, if desired, be provided with additional numeral indications reading consecutively from the first "departure" station, as in this instance the station "Endevl."

The indicator dials are provided with suitable station indications circumferentially spaced relative to their separating road distances or fare zones. These station indications or names are arranged to aline with window apertures in station pointer arms 111, 111ª, 112, 112ª, the arms 111, 111ª indicating the "departure" stations and the arms 112, 112ª the "destination" stations. The indication shown in Fig. 1 is for a fare from "Claremont" to "Linnberg."

Referring to Fig. 4, 115 is a clutch wheel splined to the shaft 15 by a pin and slot connection 116 and provided with fixed clutch pins 117 adapted to engage in clutch apertures 118 of a toothed clutch wheel 119. The wheel 119 is fixed to a flanged sleeve 120 loose on the shaft 15 and having a tongue and slot connection with an adjacent sleeve 121 carrying the "departure" indicating arm 111. The sleeve 120 is connected to move laterally with the shaft and to revolve thereon by a pin 122 projecting beyond the periphery of said shaft and into a circular recess in the sleeve, the recess being closed by a washer 123 fixed to said sleeve.

The "destination" indicating arm 112 is secured to a collar 124 provided with a square aperture to fit the squared end of the shaft 15, both indicating arms being retained in normal lateral position by a coil spring 125 and washer 126. A sleeve 127, carrying the "arbitrary" pointer arm 128 is loosely journaled on the sleeve 120 and has secured to its inner end an "arbitrary" gear 129, said gear being in position to be engaged and operated by a segmental gear 130 fixed to the "arbitrary" shaft 96. A cross plate 131 extends across the dial casing and the spaced relationship between the gear 129 and the clutch wheel 115 is maintained by spacing pins 132 frictionally engaging the opposing surfaces thereof and passing through apertures in the clutch wheel 119 and connected sleeve flange and washer. The clutch wheel 119 is locked against rotation when in normal lateral position by a stationary toothed lock plate 133, which engages the toothed periphery thereof.

The indicating mechanism contained in the dial casing 3 comprises a clutch wheel 140 fixed on the shaft 15 and having fixed clutch pins 142, adapted to engage in clutch apertures 143 of a toothed clutch wheel 144 fixed on a sleeve 145, said sleeve being loosely journaled on the shaft and having fixed to its outer end a "departure" indicating arm 111ª. The "destination" indicating arm 112ª is fixed on the outer end of the shaft 15 and moves therewith. The wheel 144 is maintained in its normal lateral position by spacing pins 146 extending through the wheel 140, their opposite ends frictionally engaging the opposing surfaces of the dial casing and wheel 144. For the purpose of locking the clutch wheel 144 against rotation when the wheel 140 is in normal lateral position, I provide a lock arm 147 pivoted on the dial casing and provided with a bifurcated upper end embracing the peripheral edge of the clutch wheel 140 and having a beveled tooth, adapted to engage the toothed periphery of the wheel 144. The "arbitrary" gearing and indicating pointer of the casing 3 is a duplicate construction of dial casing 2 and each gear 129 is yieldingly restrained against accidental rotation by a spring pressed arm 148 pivoted to the cross plate 131 and provided with an antifriction roller 149 engaging in a recess in the inner periphery of the circumferential web of said gear.

Above the indicator dials 110, each cover plate 109 is provided with a window opening for displaying a half-fare indication. The "half-fare" indicators 150 are each pivotally mounted on their respective cover plates and are raised to indicating position by oscillating arms 151 secured to the ends of the half-fare shaft 77, (see Figs. 2, 4 and 8).

From the above it will be seen that the lateral shifting of the shaft 15, to the right, (Fig. 4), will engage the companion clutch wheels so that the rotary setting of said shaft will move both sets of station indicating arms until the "departure" indicating arms 111, 111ª, are set to indicate the station of departure and when the shaft is shifted back to normal lateral position, the clutch wheels 119, 144, and connected "departure" indicating arms 111, 111ª, will be locked against rotation by the lock elements 133, 147, the subsequent rotary setting of the shaft 15 moving only the "destination" indicating arms 112, 112ª, to indicate the "destination" station.

*Printing mechanism.*

The main elements of the printing mechanism comprise the printing platens and their operating devices. Referring to Figs. 4, 6 and 10, 160 represents a wide platen mounted on a platen arm 161 loosely journaled on a cross-rod 162. This platen is of sufficient width to coöperate with both station wheels. 163, 164 represent narrow printing platens mounted respectively on platen arms 165, 166, fixed on the rod 162. The rod 162 is adapted to be laterally shifted to aline the platens 163, 164, with either the "out" miles and "out" cash type wheels, or the "in" miles and "in" cash type wheels and is provided with an operating arm 167, (see Fig. 11), pivotally mounted on the end frame 11. A spring pressed ball detent 168 engages recesses 169 in the rod to retain said rod in set positions. The platen arm 161 is retained against lateral displacement by a coil spring 170 surrounding the rod 162 intermediate said arm and the platen arm 165.

The platen operating means comprises three duplicate platen cams 170, 171 and 172 each consisting of a body portion and a spring pressed pivoted cushion arm 173, adapted to elevate its companion platen arm in a printing operation during an oscillating movement of its cam, the platen arms being retained against their respective cams by coil springs 204 attached to said platen arms and to a cross-rod 205.

The cams 170, 171, are fixed to a sleeve 174 journaled on a shaft 175, said shaft and sleeve being journaled in bearings in the end frames 11, 12. The platen cam 172 is loosely journaled on the sleeve 174 and is secured to rotate with the shaft 175 by a transverse pin 176 projecting through segmental slots 177 in said sleeve, (see Fig. 7). This provides an independent movement of the sleeve to operate the platens 170, 171, to print a record of stations and miles to record ticket fares and passes. If a cash fare is recorded the shaft 175 is operated and through the pin 176 carries with it the sleeve, thereby operating all three platens.

As shown in Fig. 4, said shaft and sleeve extend beyond the end frame 12, the shaft having fixed thereon an operating arm 180, a duplicate arm 181 being loosely journaled on the sleeve. Intermediate these arms a grooved segmental plate 182 is fixed on the sleeve and is provided with a stud 183 extending into the path of movement of the arms 180, 181, which are pivotally connected to operating rods 184, 185, extending to the operating mechanism at the side of the car. This arrangement provides an independent oscillation of the sleeve 174 and plate 182 by the movement of the arm 181 and a combined oscillation of sleeve 174, plate 182 and shaft 175 by the oscillation of the arm 180. To provide a positive return to normal of these parts, I provide a spring 186 secured at one end to a stud on the end frame 12 and having its opposite end connected by a chain 187 to a pin 188 fixed to the plate 182. Said chain tracks around the hub and in the groove of the plate. The periphery of said plate is provided with full stroke ratchet teeth 189 for coöperation with a spring centered full stroke pawl 190. A stop pin 191 fixed to the frame 12 defines the normal position of the arms 180, 181 and plate 182.

To provide a record of the number of cash fares and of the total fares collected, I provide two consecutive numbering printing counters 195, 196. These may be of any desired specific construction and are shown herein as being operated by oscillating arms 197, 198, pivotally connected to links 199, 200, each connected by pin and slot connections to arms 201, 202. The arm 202 is provided with a hub 203 fixed to the shaft 175 and through its connecting link 200 and arm 198 operates the counter 195 to record the number of cash fares collected. The arm 201 is fixed to the end of the sleeve 174 and through its connecting link 199 and arm 197 operates the counter 196 to record the total number of fares collected. To record other data, such as train number, division number and date, I provide manually operated printing wheels 206 alined with the counters 195, 196. To print a record from these counters and wheels, I provide a printing platen 207 extending the entire width thereof and mounted upon a clevis arm 208 loosely journaled on the cross-rod 162. Cams 209 fixed on a rock shaft 210, journaled in the end frames, operate to elevate the clevis arm 208 to print a record from the counters and data wheels, the shaft 210 being provided with an operating handle 211 for manual manipulation by the conductor. Springs 212 connected to the arm 208 and rod 205 retain the arm 208 in contact with the cams 209.

To lock the main printing mechanism during the shifting of the main indicator shaft 15, there is provided a spring normalized bolt 220 journaled to slide in vertically alined bearings on the end frame 12. Said bolt has a cone-shaped upper end normally positioned within a V-groove of a stud 221 slidably mounted in the frame 12 and having a groove 222 in which engages the flange 89 formed on the sleeve 19. The lower end of the bolt 220 registers with a recess 224 in the sleeve 174 when said sleeve is in normal position to lock said sleeve when the shaft 15 is laterally moved from normal position.

It is also desirable to rigidly lock the shaft 15 against rotation during a printing operation, and for this purpose there is provided a main lock arm 230 pivoted on the frame 12 and provided with a beveled edged angle extension 231 adapted to engage the toothed periphery of the main shaft alining wheel 25. The lower end of the arm 230 engages and is operated by a cam 232 formed integral with the sleeve 174 of the printing mechanism.

240 represents a record strip which is unwound from the supply roll 241 over guide rods 242, 243, and rewound on the storage roll 244. 245 represents an ink ribbon entrained from one ribbon roll 246 to the opposite ribbon roll 247 over guide rolls 248, 249. The record storage roll 244 and the ink ribbon rolls 246, 247, are intermittently rotated by feed pawls 250, 251 and 252 all pivotally mounted on a reciprocatory plate 253 and adapted to engage their respective ratchet wheels 254, 255, 256. The plate 253 is slidably mounted on the shafts of the ink ribbon rolls and is reciprocated by a cam 257, formed integral with the sleeve 174, and engaging the opposing edges formed by a recess in the lower edge of said plate. A ribbon reverse comprises a slide 259 retained in operated positions by a spring pawl 260 and adapted to alternately disengage the pawls 251, 252, from engagement with the ratchet wheels 255, 256. Each ribbon roll is provided with an operating rod 261 mounted to slide in radial slots in the roll flanges and retained in normal position out of alinement with the ends of the ribbon shift slide 259 by the ribbon. When the ribbon supply on one roll is exhausted the rod 261 is released, dropping into the path of the slide 259, operating it to effect a reverse ribbon feed.

*Setting and operating mechanism.*

The setting mechanism is controlled by two parallel horizontal rods 270, 271, extending the length of the car and provided at suitable intervals with hand grips 272. These rods are journaled in a housing 273 fixed to the partition and in depending brackets 274 at spaced intervals throughout the length of the car. The rod 270 may be termed the selecting rod as its manipulation selects or determines the sequence of recorder operations while the rod 271, which I term the operating rod, sets the selected type wheels to proper recording position.

Journaled on the rod 270 within the housing 273, (see Fig. 12), is a cylinder 275 having a sprocket 276 engaged by the chain 100 of the "arbitrary" operating device previously described. 277 represents a hub journaled on the rod 270 and provided with an arm 278 projecting through a slot in the housing 273 and connected by a link 279 to a bell crank 280 pivoted on the housing and pivotally connected to the "half-fare" operating rod 74. To limit the normalizing movement of the arm 278, I provide a stop screw 269 adjustable on the housing. 281 represents a cylinder journaled on the rod 270 and provided with a sprocket 282 engaged by the chain 21 of the main shaft shifting device. Each of these elements 275, 277, and 281 are yieldingly retained in normal position by spring plungers 283 slidably mounted in the housing and having rounded inner ends engaging with rounded recesses in the peripheries thereof.

The cylinders 275 and 281 have internal longitudinal key-ways 285, 286, normally arranged in staggered relation, (see Fig. 16) and the hub 272 has a wide key-way 287. The rod 270 is provided with a key 288 adapted to traverse these key-ways to operatively aline with either of the three elements 275, 277, 281. These elements are separated by stationary stop plates 289, 290, each loose on the rod and extending downwardly and engaging in apertures in the housing. These plates have internal peripheral notches 291, 292, alined relative to the normal positions of the key-ways 285, 286. These stop plates and the staggered relationship of the key-ways compel an intermittent lateral shifting of the rod 270, thereby assisting in properly alining the key 288 in the key-ways and compelling the normalizing of the cylinders 275, 281, previous to a shifting of the key 288 out of their respective key-ways 285, 286, into the key-way 287 of the intermediate "half-fare" element 277. The wide key-way 287, however, permits a shifting of the key 288 therefrom and into the key-way 285 of the "arbitrary" element 275 after the "half-fare" element 277 has been operated and before its return to normal.

The setting rod 271 has fixed thereto a sprocket 300 engaged by the chain 63 which connects with the sprocket 62 of the main drive shaft of the recorder.

The operation of the selecting and setting rods 270, 271, is as follows:—

The rod 270, positioned as shown in Fig. 12, is rotated to shift the main shaft 15 of the recorder, clutching the "destination"

type wheel 38 to the "departure" type wheel 32. The rod 271 is then rotated to set the "departure" type wheel 32 and indicator arms 111, 111ᵃ. The rod 270 is again and reversely rotated to shift the shaft 15 back to normal lateral position, clutching the "departure" type wheel 38 to the value type wheels and the rod 271 rotated to set the "departure" and value type wheels 34, 35, 46, 47, and the "departure" indicating arms 112, 112ᵃ.

If a half-fare is to be indicated, the selecting rod 270 is shifted to the right, Fig. 12, until the key 288 strikes the top plate 289 and the rod oscillated to operate the "half-fare" recording and indicating mechanism.

To set the "arbitrary" mechanism, the rod 270 is further shifted to position the key 288 within the key-way 285 for rotation of the cylinder 275 and sprocket 276.

To lock the recorder against operation, I provide means for locking the sprocket 282, thereby preventing the first necessary setting for a proper recording operation. This means comprises a grooved bolt 301 slidable within a bore in the housing 273, and provided with a rounded inner end adapted to register with a lock recess 302 in the cylinder 281 of the sprocket 282. The lock bolt of a key operated lock 303 engages either of two grooves in the bolt 301 to retain said bolt in locking or unlocking position.

After the setting of the recording mechanism, as just described, the printing of the record is accomplished by manipulation of the rods 184, 185.

305 represents a vertical sleeve journaled in bearings 306 on the housing 273, and 307 represents a shaft journaled within and projecting beyond said sleeve. Arms 308, 309, are secured to the upper ends of the sleeve and shaft and are pivotally connected to the rods 184, 185. To the lower end of the sleeve is fixed a rope sheave 310 and a duplicate sheave 311 is fixed to the lower end of the shaft. The sheave 310 is operated by pull ropes 312, 312, fastened thereto at 314, 314, and leading in both directions, said ropes being supported by sheaves 316 suspended from the brackets 274 beneath the rod 271. The sheave 311 is also provided with similar pull ropes 317, 317, fastened thereto at 319, 319, and supported by sheaves 321 suspended from the brackets 274 beneath the rod 270. On one side of the partition these ropes are crossed, as shown in Fig. 2, to bring both ropes of each set to the same relative transverse position.

It will be understood that a pulling of the rope 317, will oscillate the arm 309 and translate the rod 184 to record a cash fare and pulling of the rope 312 will, in the same manner, oscillate the arm 308 to translate the rod 185 to record a ticket fare or pass.

Having described my invention, I claim:—

1. In a fare recorder, a plurality of character carrying wheels coaxially alined and adjacently arranged, the characters of said wheels respectively representing on a first wheel the starting points, a second wheel destination points and a third wheel the values between definite starting and destinating points of said first and second wheels, means for unitarily moving said first and second wheels to bring a definite character of said first wheel to a reading point and alternately unitarily moving said second and third wheels to bring definite characters on said wheels to a corresponding reading point with said first wheel, the third wheel thereby representing a relationship between the starting point and the destination point characters, and means for laterally shifting the intermediate of said wheels for alternately connecting the same to the opposite wheels for unitary rotation of the connecting wheels.

2. In a fare recorder, a plurality of character carrying members arranged side by side upon a common axis, the characters of said members respectively representing on a first wheel the starting points, a second member the destination points and third member the values between definite starting and destinating points of said first and second members, means for unitarily moving said first and second members to bring a definite character of said first member to a reading point and alternately unitarily moving said second and third members to bring definite characters on said members to a corresponding reading point with said first member, the third member thereby representing a relationship between the starting point and the destination point characters, and means for laterally shifting the intermediate member for alternately connecting said member to its opposite members for unitary movement of the connected members.

3. In a fare register, a first movable member bearing a coördinate series of starting point characters, a second movable member bearing a coördinate series of destination point characters, and a third movable member bearing a coördinate series of traffic value characters, one of said members arranged intermediate of the other two and laterally shiftable for alternately connecting said member to its opposite members, and means for alternately moving in pairs the members bearing the starting point and destination point characters, or the members bearing the destination point and traffic value characters, and means for alternately locking said first and third members when divorced from said second member.

4. In a fare register, a movable member bearing a coördinate series of starting point characters, a movable member bearing a coordinate series of destination point characters, and a movable member bearing a coordinate series of traffic value characters, one of said members arranged intermediate of the other two and laterally shiftable for alternately connecting said member to its opposite members, said members being movable in parallel plane providing a common indicating position, and the said characters on said members being serially arranged and uniformly spaced thereon, means for alternatively moving in pairs the members bearing the starting point and destination point characters, or the members bearing the destination point and traffic value characters, and means for alternately locking said starting point and traffic value character bearing members when divorced from said destination point bearing member.

5. In a fare register, a movable member bearing a coördinate series of starting point characters, a movable member bearing a coordinate series of destination point characters, and a movable member bearing a coordinate series of traffic value characters, one of said members arranged intermediate of the other two and laterally shiftable for alternately connecting said member to its opposite members, said members being movable in parallel plane providing a common indicating position, and the said characters on said members being serially arranged and uniformly spaced thereon, means for alternatively moving in unison the members bearing the starting point and destination point characters, or the members bearing the destination point and traffic value characters, and means for locking in position the idle member when two of said members are operated in unison.

6. In a fare recorder, a plurality of character carrying wheels coaxially alined, a first wheel thereof bearing starting point characters, a second wheel destination point characters, and a third wheel a plurality of coördinate series of traffic value characters arranged in a reverse order for "in" and "out" reading, one of said wheels arranged intermediate of the other two and laterally shiftable for alternately connecting said member to its opposite wheels, means for unitarily moving said first and second wheels to bring a definite character of said first wheel to a reading point and alternately moving said second and third wheels in either forward or reverse directions to bring definite characters on said wheels to a corresponding reading point with said first wheel.

7. A fare computing device comprising a movable member bearing an alinement of starting point characters, a movable member bearing an alinement of destination point characters, and a movable member bearing an alinement of traffic value characters, one of said members arranged intermediate of the other two and laterally shiftable for alternately connecting said member to its opposite members, said members being movable in parallel planes providing transverse alinement of characters relative to an indicating point, said members being correspondingly and uniformly graduated and the characters being serially arranged relative to the spaces defined by said graduations, the serial characters on the starting point and destination point members being duplicates, the traffic member having a negative value space to be alined with corresponding starting and destination point characters in the initial setting of said members, and means for alternatively connecting the members bearing the starting point and destination point characters, or the members bearing the destination point and traffic value characters for moving definite characters thereof to a common reading line.

8. In a computing device, three members movable in parallel planes, the first and second members bearing duplicate series of designating indications having relative values, said designating indications being correspondingly arranged on said members, the third member bearing a series of indications representing the series of relative values of the different designation combinations starting with a negative indication to be initially set in registration with the same registering designation indications on said first and second members, said value indications being arranged to correspond with the duplicate designation indications, there being the same number of indications on each of said three members, one of said members arranged intermediate of the other two and laterally shiftable for alternately connecting said member to its opposite members, and means for connecting one member to move in unison with either of the other two members.

9. A device of the class described comprising station type wheels, miles type wheels and cash type wheels, means coöperatively connecting one station type wheel with a second station type wheel or with the miles and the cash type wheels operating as a unit, an arbitrary device for adjusting the cash type wheels independently, and means for locking the station and the miles type wheels during said arbitrary adjustment of the cash type wheels.

10. A device of the class described comprising station type wheels, miles type wheels and cash type wheels, means coöperatively connecting one station type wheel with a second station type wheel or with the miles and the cash type wheels operating as a unit, an arbitrary device for adjusting the cash type wheels independently, station indicating devices operated coördinately with the type wheels, and an independent indicator operated by the arbitrary device.

11. A device of the class described comprising two station type wheels, two miles wheels moving as a unit with the miles characters on said wheels relatively arranged in the reverse order, and two cash type wheels moving as a unit with said miles wheels and characters on said "cash" wheels relatively arranged in the reverse order, means for alternately connecting one station wheel to the station wheel or miles and cash wheels for moving said wheels to bring definite characters to the printing line, a printing device coöperating with said type wheels, including a printing platen coöperating with both station wheels, a second printing platen selectively coöperating with one miles wheel, a third printing platen selectively coöperating with one cash wheel, means for selectively alining the second and third platen with either of the miles and cash type wheels, and devices for operating the platens in a printing operation.

12. A device of the class described comprising station type wheels, miles type wheels and cash type wheels, said miles and said cash type wheels having a plural set of duplicate characters arranged in a relatively reverse order, a printing platen for each class of wheels, means for operating the platens in unison, means for shifting the platens of said miles and cash type wheels for alternately coöperating with the several sets of characters thereon, and a separate means for operating only the station wheels platen and the miles wheels platen.

13. A device of the class described comprising a departure station type wheel, a destination station type wheel and traffic value type wheels, and means for translating the destination station type wheel to alternately connect it for unitary rotary adjustment, with the departure station type wheel or with the traffic value type wheels.

14. A device of the class described comprising a departure station type wheel, a destination station type wheel and traffic value type wheels, means for laterally translating the destination station type wheel to alternately connect it for unitary rotary adjustment with the departure station type wheel or with the traffic value type wheels, a printing device coöperating with the type wheels, and means for locking the printing device during the translatory movements of the destination station type wheel.

15. A device of the class described comprising a departure station type wheel, a destination station type wheel and traffic value type wheels, means for laterally translating the destination station type wheel to alternately connect it for unitary rotary adjustment with the departure station type wheel or with the traffic value type wheels, a printing device coöperating with the type wheels, and means providing a differential operation thereof to record different classes of fares.

16. In a fare recorder, a plurality of character carrying wheels coaxially alined, a first wheel thereof bearing around its periphery starting point characters, a second wheel destination point characters, a third wheel traffic value characters in duplicate arranged in a relative reverse order for in and out reading, means for unitarily revolving said first and second wheels to bring a definite character of the first wheel to a reading or printing point and alternately revolving said second and third wheels to bring definite alined characters on said wheels to a corresponding point with said first wheel printing plates coöperating with said wheels as a printing point, and means for laterally shifting the platen coöperating with said third wheel for making an alternate impression from one or the other of its sets of characters.

17. A device of the class described comprising a departure station type wheel, a destination station type wheel and traffic value type wheels, means for translating the destination station type wheel to alternately connect it for unitary rotary adjustment with the departure station type wheel or with the traffic value wheels, a printing device coöperating with the type wheels, means for yieldingly alining the type wheel characters during the type wheel adjustment, a lock device for locking the alined type wheels during a printing operation, and means for locking the printing device during the translatory movements of the destination type wheel.

18. A device of the class described comprising a departure station type member, a destination station type member, traffic value type members, said members arranged adjacent each other, with the intermediate member movable laterally to alternately connect with its opposite member for moving either therewith to bring definite type characters thereof to a printing line and a type member bearing a half-fare type character, means for alternately moving in unison the departure and destination station type members or the destination station and traffic value type members, an indicator for each station type member coördinately operated therewith, a half fare indicator coördinately operated with the half-fare type member, means for operating the half-fare type member and indicator, and a printing mechanism coöperating with the type members in a printing operation.

19. In a device of the class described comprising a departure station recording member, a destination station recording member and a traffic value recording member, clutch devices alternately connecting the two station recording members or the destination station and traffic value recording members, a selecting device for operating the clutch devices, and an operating device for adjusting the connected recording members.

20. A fare recorder, a departure station type carrying recording wheel, a destination station type carrying recording wheel, a third type carrying wheel having type characters representing the relationship between the departure and destination stations of the character of said first-named wheels, said wheels arranged coaxially and adjacent to one another, with the intermediate wheel movable laterally into connection alternately with the opposite wheels for revolving the same in unison therewith to bring definite type characters to a printing line, means for preventing independent rotation of any of said wheels during the lateral movement of said intermediate wheel, and means for preventing rotating motion of said opposite wheels when disconnected from the intermediate wheel.

21. A fare recorder, a departure station type carrying recording wheel, a destination station type carrying recording wheel, a third type carrying wheel having type characters representing the relationship between the departure and destination stations of the character of said first-named wheels, said wheels arranged coaxially and adjacent to one another, with the intermediate wheel movable laterally into connection alternately with the opposite wheels for revolving the same in unison therewith to bring definite type characters to a printing line, means for preventing independent rotation of any of said wheels during the lateral movement of said intermediate wheel, means for preventing rotating motion of said opposite wheels when disconnected from the intermediate wheel, a fourth type-carrying wheel bearing money value characters frictionally connecting with said third type wheel, and means for independently revolving said wheel.

22. A device of the nature described comprising a first series of station recording members and a second series of two groups of traffic value recording members normally unitarily adjusted, a classification recording member, a translatory device selectively connecting one of the station recording members with its companion station recording member or with the second series of recording members, a setting mechanism for both series of recording members, and means serially functioning to operate the translatory device, adjust the classification recording member and arbitrarily, independently alter the setting of one group of the second series of recording members.

23. A fare recorder comprising a recording mechanism having a departure type wheel, a destination type wheel, a series of two groups of traffic value type wheels normally unitarily adjusted and a classification type member, a translatory device for selectively connecting the destination type wheel with the departure type wheel or with the series of traffic value type wheels for subsequent unitary setting, an operating rod for setting the connected type wheels and a selecting rod axially adjustable to selective operating positions and rotarily adjustable to operate the translatory device, to position the classification type member, and to arbitrarily, independently alter the setting of one group of the series of traffic value type wheels.

24. A device of the class described comprising a frame, a shaft journaled in the frame, a type wheel loose on the shaft, an indicator arm loose on the shaft, a type wheel fixed on the shaft, an indicator arm fixed on the shaft, means for shifting the shaft to coöperatively connect the type wheels and indicator arms for subsequent rotary adjustment, and means for rotatively adjusting the shaft.

25. A device of the class described, a frame, a shaft journaled in said frame, a pair of type wheels on said shaft, one wheel fixed thereon and the other loose thereon, said wheels around their peripheries having corresponding characters arranged in the same order, means for connecting said wheels to rotate as a unit, an indicator dial at each end of the shaft, a pair of index fingers for each dial, one fixed to said shaft and the other loose thereon, means for connecting said fingers to rotate as unit, and means for shifting the shaft to connect and disconnect the type wheels and the index fingers.

In witness whereof, I hereunto subscribe my name, as attested by the two subscribing witnesses.

LLEWELLYN BONHAM.

Witnesses:
 DORA DRACHENBERG,
 L. A. BECK.